United States Patent

Moran et al.

[11] 4,027,203
[45] May 31, 1977

[54] PROTECTIVE SWITCH DEVICE FOR ELECTRICAL DISTRIBUTION SYSTEMS

[75] Inventors: Richard J. Moran; William N. Le Court, both of Milwaukee, Wis.

[73] Assignee: McGraw-Edison Company, Milwaukee, Wis.

[22] Filed: Mar. 6, 1975

[21] Appl. No.: 555,947

[52] U.S. Cl. .................................. 361/98; 361/89
[51] Int. Cl.² .......................................... H02H 3/08
[58] Field of Search ........ 317/36 TD, 33 SC, 33 R, 317/18 D, 141 S

[56] References Cited

UNITED STATES PATENTS

| | | | |
|---|---|---|---|
| 3,345,539 | 10/1967 | Ashenden et al. | 317/36 TD X |
| 3,434,011 | 3/1969 | Zocholl | 317/33 |
| 3,602,783 | 8/1971 | Engle et al. | 317/36 TD X |
| 3,713,005 | 1/1973 | Engel | 317/36 TD X |
| 3,786,311 | 1/1974 | Hobson, Jr. et al. | 317/36 TD X |
| 3,831,061 | 8/1974 | Boyd | 317/36 TD |
| 3,875,464 | 4/1975 | Gary et al. | 317/36 TD X |

*Primary Examiner*—J D Miller
*Assistant Examiner*—Patrick R. Salce
*Attorney, Agent, or Firm*—Andrus, Sceales, Starke & Sawall

[57] ABSTRACT

A protective device includes a circuit breaker with an operating means connected to a fault current sensing control circuit. A small line current and/or a small fault current sensing current transformer means is conductively connected through individual rectifiers and series sensing resistors as a current source to charge a common power supply capacitor. A voltage limiting means across the capacitor maintains the current source. A high impedance signal processing amplifier includes a sensing transistor connected to the sensing resistor which establishes a minimum trip level and driving coupling transistors connected to the capacitor and including voltage sensitive means to positively inhibit full amplifier turn-on before the power supply capacitor is charged to an operating voltage level. In a fault condition, the amplifier rapidly charges a hold-on capacitor which slowly discharges to activate a timing control transistor of a time delay circuit, the output of which triggers a rapid, stabilized switch to operate the circuit breaker. The timing circuit may be driven from the power supply capacitor or a separate timing source capacitor which rapidly charges to the peak value of the sensing resistor and slowly discharges to establish a relatively constant and high average current such that timing is not sensitive to current transformer saturation. Where both line and ground fault sensors are connected to the common amplifier, they share the same timing means and have the same delay curves with a significant reduction in circuit cost and complexity. A clamping network may be connected to the sensing resistor to also minimize transformer core saturation and establish a maximum timing current and allow heavy fault currents of short duration.

29 Claims, 5 Drawing Figures

PROTECTIVE SWITCH DEVICE FOR ELECTRICAL DISTRIBUTION SYSTEMS

BACKGROUND OF THE INVENTION

This invention relates to a fault sensing control circuit for power systems and the like and more particularly to such a control circuit having current sensing means for controlling power line switchgear.

Power distribution systems normally include automatic circuit breakers which respond to various overcurrent conditions. For example, U.S. Pat. No. 3,739,229 to Richard J. Moran discloses a distribution system employing an improved repeating circuit interrupter. As more fully disclosed therein, the interrupting circuit is constructed to respond to overcurrent line conditions and/or a ground fault condition in the electrical distribution system. In distribution systems, the faults may be of a temporary nature which will automatically clear, in which case a mere momentary opening of the circuit system is all that is necessary, after which the circuit can be reestablished. Certain abnormal conditions may be so severe that practically instantaneous response is required. In other instances, the faults are of a temporary characteristic or nature and will automatically clear. They may be of a transient characteristic and of such short duration that they will not adversely affect the equipment tied to the line or the like. The control circuit should, therefore include a minimum response control to permit such faults without actuating of the control. The various restrictions and conditions encountered have required development of relatively sophisticated control circuitry for operating of various interrupters in circuit breakers. Further, the switchgear should be flexible to permit application to various facets of the protection system required. Thus, certain installation may require a control circuit which responds to only ground faults while another only to line current faults and still another to both. Although such systems are clearly justified by the damaging results which follow without adequate line protection, such sophistication does generally result in substantial increased cost. There is, however, a continuing need for improved reliability and decreased costs in the control circuitry for line distribution switchgear.

SUMMARY OF THE PRESENT INVENTION

The present invention is particularly directed to a current sensing control circuit for power distribution protective device and the like which obtains operating power from the system current and which may be coupled to respond to the sensing of either phase and/or ground fault currents and which provides reliable time delay response with widely varied overcurrent conditions. Generally, in accordance with one aspect of the present invention, a protective device for generating an operating signal includes a sensing means which is coupled to the distribution lines to sense current faults and is connected to charge a power supply capacitor means for operating of the protective device and includes an inhibit means which prevents forming of a timing control signal before the capacitor means is charged to the level necessary to operate the protective device.

In accordance with a further feature and aspect of the present invention, line current sensing current transformer means are connected through sensing resistor means as a current source to charge the power supply capacitor to a level somewhat above a minimum operating level. A parallel voltage limiting means of low impedance holds the power supply capacitor charged at some level above the tripping level and particularly maintains a current source having low losses in the power supply section and thereby maintains reliable and responsive triggering to actual fault conditions. The current transformers may be small core units which may saturate under fault conditions and still operate to supply the operating power to the system as well as to reliably create a detectable fault signal. In order to prevent the possibility of tripping the system without adequate power to actuate the actuator or tripper, the control circuit of this invention includes a high input impedance solid state detection switch means such as an amplifying means which senses and is conjointly controlled by the level of the capacitor voltage as well as the magnitude of the fault current to prevent formation of a timing delay control signal before the circuit is armed. The control circuit is a preferred construction includes a sensing transistor having its input connected across the power supply capacitor and include voltage sensitive means to positively inhibit turn-on of both coupling transistors before the power supply capacitor is charged to a preselected minimum voltage. The resistance of the sensing resistor determines the minimum line current which will cause a pick-up and fault timing to be initiated after the power supply capacitor has been sufficiently charged to arm the circuit.

In a preferred construction, the coupling transistors function as a directed coupled amplifier when an overcurrent condition is sensed and coupled to charge a first hold-on capacitor which rapidly charges and provides an input control signal to a timing control transistor. The hold-on capacitor discharges at a selected rate to the transistor for a predetermined time, generally more than a cycle of the line frequency. As long as this capacitor is recharged each cycle, the timing control transistor will be acutated and permit timing of a time delay circuitry which is connected to operate the switchgear after a predetermined time.

The time delay circuit may be driven from the power supply capacitor or particularly where line current is sensed and small transformers are employed, a separate timing power source may be provided including a capacitor means coupled to the fault sensing network and charged to the peak value of the networks. This voltage is slowly discharged through a controlled resistance network to establish a relatively high average current. The system will then be insensitive to saturation of the current transformers resulting from offset faults and permit use of relatively inexpensive current transformers.

The present invention thus provides a power supply driven from the pick-up, and the circuit operates to initiate timing only after the power supply capacitor has been charged to a minimum voltage adequate to perform the functioning within the circuit and only when the fault current is above a selected peak value. When such conditions occur, timing is initiated. The output of the timing circuit preferably employs a pair of interconnected transistors such as a regenerative circuit having stabilizing capacitor means which prevent false triggering as the bus voltage rises while, however, developing a pulse signal. A controlled rectifier or other gated switch has its input connected to receive the pulse signal and its output connected in series with an operator such as a flux-shift tripper coil, a bistable actuator or the like across the power supply capacitor.

Where both phase and ground fault current sensors are employed the output responds in accordance with the higher voltage developed by the two pick-up circuits and may be connected to drive a single, common timing circuit. The sharing of the time delay curves from the different pick-ups for either phase or ground faults may significantly reduce the circuitry required with a minimizing of overall cost. Generally the characteristics will then, of course, have the same time curve delay characteristic for ground fault curve and for the phase fault curve. If different characteristics are absolutely essential, separate output and timing circuitry may be employed.

In the combined system, the individual phase and ground fault currents may be connected in parallel series to the capacitor. Alternatively, the phase current line sensing circuit may be connected to charge the power supply capacitor with the ground fault current sensing connected directly to the common sensing transistor to provide sensitive ground fault detection.

In accordance with another feature of the present invention, a minimum time delay essentially independent of the magnitude of fault current before actuation of the circuit opening means may be ensured by establishing a maximum voltage on the sensing resistors and the input transistor means. This also establishes a minimum fault timing by minimizing the build-up of voltage on the sensing resistor. The minimum time delay feature may be employed, for example, where a desire to have a fuse blow for clearing of the fault rather than operating through the recloser under certain fault conditions. For example, the sensing transistor means may include a clamping network to clamp the maximum voltage of the sensing resistor at some value to create a preselected response timing. This clamping will also minimize saturation of the current transformer, thereby further permitting use of low cost transformers as well as assuring a minimum time delay regardless of the magnitude of the input fault currents.

The coupling of the sensing networks to the capacitor and the electronic circuitry may further be readily constructed to maintain stable temperature operation in both the pick-up and the timing circuitry by suitable matching of the components and the like.

Thus in the present invention, the power supply capacitor means functions to provide power to the complete protective system with fault signal processing circuit operation inhibited until such time as the power supply is charged to a sufficient level for reliable operable tripping in response to fault conditions. The protective device may employ small, low cost sensing current transformer with the circuitry reliably detecting the various line and ground faults.

BRIEF DESCRIPTION OF THE DRAWINGS

The drawings furnished herewith illustrate the best mode presently contemplated by the inventors and clearly disclose the above advantages and features, as well as others, which will be readily understood from the detailed description thereof.

In the drawings:

FIG. 1 is a schematic circuit illustration of an electrical distribution system incorporating a novel current sensing and control circuit constructed in accordance with the present invention;

FIG. 2 is a circuit diagram illustrating a modification to the input circuit shown in FIG. 1;

DESCRIPTION OF ILLUSTRATED EMBODIMENTS

Figures 1, 2:
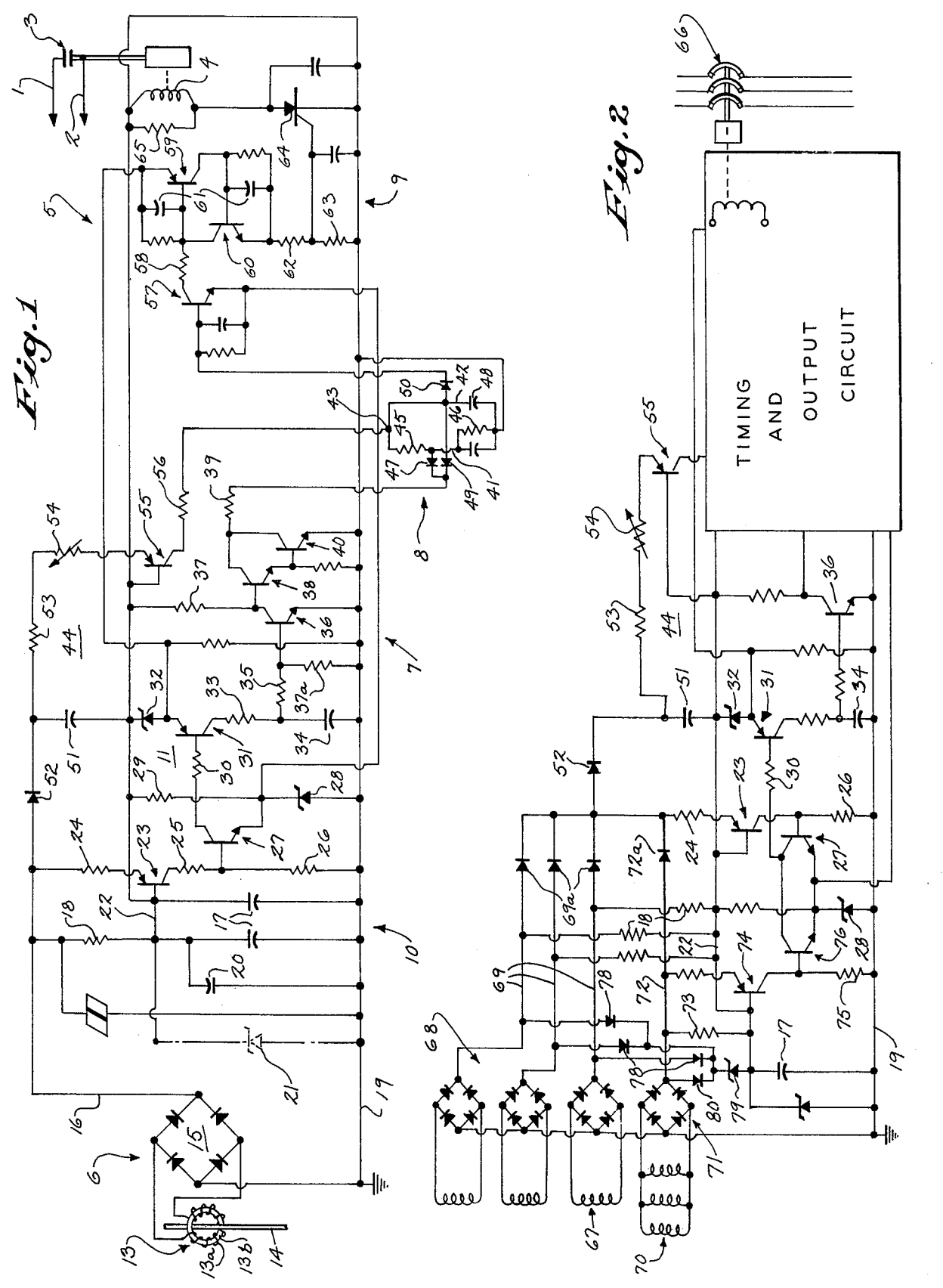
Figure 3:
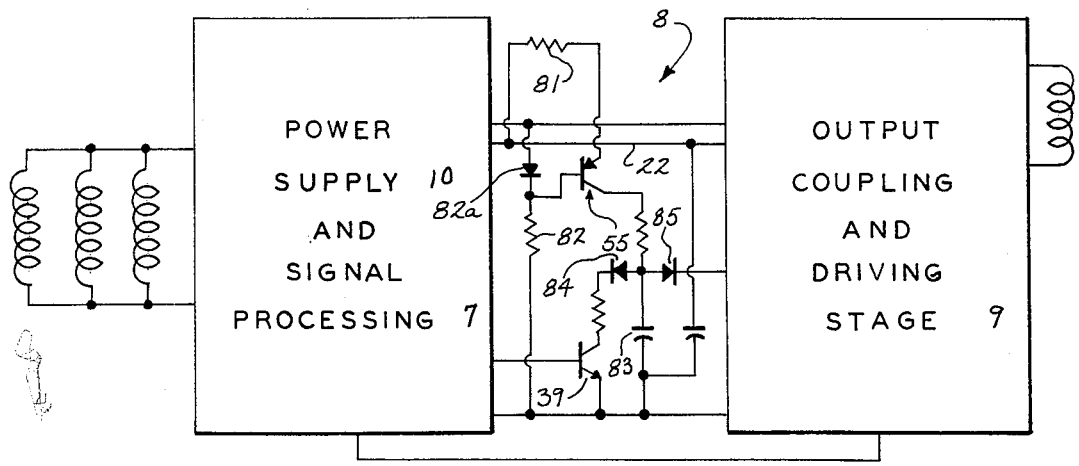
FIG. 3 is a pick-up system similar to FIG. 1 showing a further modification therein.

Referring to the drawings and particularly to FIG. 1, an electrical distribution system is illustrated including a single phase distribution power line 1 - 2 to the opposite sides of a circuit breaker or interrupter 3 for segregating or isolating a load, not shown, from the electrical system.

The circuit breaker 3 may be any suitable well-known multiple contact device and preferably responds to operation of a low energy trip coil 4 forming a part of the output stage of a fault sensing circuit 5. The circuit breaker 3 may advantageously be constructed as a vacuum interrupter having a spring-loaded contact for rapid interruption of the line circuit which requires manual resetting. The circuit breaker 3, in the illustrated embodiment of the invention, is actuated by a fault sensitive control circuit having a primary current pick-up network or sensing means 6 connected to drive a pick-up signal processing circuit 7. The processed pick-up signal is connected to actuate a timing circuit 8 which, after a selected delay in response to a fault condition, drives an out-put circuit 9 for actuating of the circuit breaker 3.

In accordance with the present invention, a power supply capacitor means 10 is driven from the network 6 and the processing circuit 7 includes an inhibiting circuit means 11 which prevents processing of a fault signal and thereby turn-on of the timing circuit 8 until supply 10 is charged to an operational level.

More particularly, in the illustrated embodiment of the invention, a suitable current sensing transformer 13, such as a small bushing transformer of a 1000:1 turn unit is coupled directly to the primary line 14 and provides an output proportional to the primary current.

As more fully developed hereinafter, transformer 13 may be a relatively small transformer unit having the secondary winding 13a wound on a continuous iron core as diagrammatically shown by a core loop 13b and constructed to saturate at a relatively low open circuit voltage such as 50 to 100 volts. For example, a current transformer having an annular core which is approximately four inches in diameter and has a rectangular cross-section of approximately one and one-half inches by one-half inch may be employed. The small current transformers are relatively inexpensive and thus minimize the cost of the electronic control systems. Even though the core may saturate, novel features of the illustrated embodiment of the invention maintain accurate fault detection. The output of the transformer 13 is conductively connected to a full wave diode bridge rectifier 15 to provide a current signal line 16 with a current proportional to the primary line current.

The current signal line 16 is connected to trigger the signal processing circuit 7 and as a current source to charge the power supply capacitor means 10, which may include a plurality of parallel capacitors 17 to increase the available power, as follows.

A fault sensing resistor 18 is connected between line 16 and the top sides of the capacitors 17, the opposite sides of which are connected to a ground 19 and to the return side of the rectifier. A transient protection capacitor 20 and a voltage limiting means shown as a Zener diode 21 are paralleled with capacitor 17 to form a stable voltage supply between a power line 22 and ground 19. A high voltage surge protecting varister 20a or the like may be connected across the rectifier. The Zener diode 21 in particular defines a low impedance after the capacitor is charged to the Zener voltage and thus maintains the sensing network functioning as a current source. A fault sensing transistor 23 has its base connected to the power line 22. The emitter of transistor 23 is connected in series with a resistor 24 to the signal line 16 and the collector is connected in series with coupling resistors 25 and 26 to ground. Transistor 23 is thus in a common base configuration and resistor 24 is selected to be large to establish a high impedance detection means. A small current may, therefore, also flow from line 16 through the resistor 24 and the emitter to base junction of the sensing transistor 23 to further charge the capacitors and bias transistor 23 on. The conduction of transistor 23 would develop a voltage across resistors 25 and 26. Resistor 26 is coupled to turn on a transistor 27, the output of which conducts if the inhibit circuit means 11 indicates capacitors 17 have been charged to operating level. Thus, the transistor 27 has its base connected at the junction of the resistors 25 and 26 and its emitter connected to ground in series with a Zener diode 28. A small bias resistor 29 connects the Zenor to the power line 22 to maintain a small bias current.

The collector of the transistor 27 is similarly connected via a coupling resistor 30 to the base of a transistor 31 which has its emitter connected to the power supply line 22 in series with a Zener diode 32. The transistor 31 cannot therefore conduct unless the power supply line 22 and, therefore capacitor 17, are at a selected voltage level sufficient to overcome the voltages of Zener diodes 28 and 32 as well as the base to emitter voltage of transistor 31. This is selected to be of a sufficient level to operate the circuitry and output stage. The two Zener diodes further function to produce a temperature stable detection of fault conditions and presence of operating voltage.

The transistor 23 is connected in a common base configuration such that its collector current will approximately equal its emitter current. The current supplied to the resistor 26 therefore is essentially directly proportional to the fault current and develops a bias voltage across the base to emitter junction of the transistor 27 and the Zener diode 28. When that voltage exceeds the sum of these two voltages, transistor 27 turns on. If the line 22 is at operating voltage, transistor 31 turns on the corresponding period that the sensed current signal at line 16 exceeds the pick-up value and supplies an output signal indicative of abnormal or fault condition. The collector of the transistor 31 is connected in series with a resistor 33 and a hold-on capacitor 34 to ground. A coupling resistor 35 connects the junction of the resistor 33 and the capacitor 34 to the base of a transistor 36 which has its emitter connected to ground and its collector connected to power supply line 22 in series with the resistor 37. a bias resistor 37a is connected across the base to emitter of the transistor 36 and in series with resistor 35 to ground. The time constant of the resistor 33 and capacitor 34 is selected to provide a very rapid charging of the capacitor 34 which then discharges through the resistor 35 and the base to emitter circuit of the transistor 36 in parallel with resistor 37a.

The Zener diode 21 may be any other voltage limiting means such as a varistor, a solid switch means or the like which will establish the low impedance path after the capacitor is charged to the minimum operating level. The capacitor voltage causes the current transformer unit to operate upwardly on the saturation curve but below the knee of the curve and in a substantially linear portion thereof. Thus, in a practical construction the minimum operating voltage was selected as fourteen volts, the maximum capacitor voltage as eighteen volts and the fault level as essentially two additional volts. The current transformer is, therefore, operating as a current source at approximately twenty volts output. The total current output of the transformer is, of course, essentially proportional to the line current minus the losses resulting from the exciting current and core requirements. Although with the present system which operates with rather significant losses in the transformer and would appear undesirable, Applicants have found that, in fact, a highly reliable and sensitive pick-up or fault current sensing means is provided.

Thus, the sensing transformer will provide reliable sensing of primary system currents on the order of five amperes. If the transformer without losses were to produce an output of two and one-half milliampere (ma) for a five ampere primary line current, for example, approximately 40% or 1 ma may be lost as the exciting current. With the high input impedance detection circuit the remaining one and one-half ma is completely adequate for purposes of charging the power supply capacitor. The operation of the transformer with relatively large losses however maintains such losses and, therefore, the exciting current essentially constant. Consequently, the system is insensitive to the usual effects of residual magnetism because the maximum spread in the magnetic characteristic at such level varies over a very small range. Further, although the small current transformers, as a result of being driven at this high level may be driven into saturation by fault currents. Applicants have further found that the peak value of output current does not shift significantly from the primary line current and, consequently, accurate and reliable detection is maintained. Thus, if the fault condition rises to twice the steady-state saturation current level, the secondary peak value is only about 10% in error. Even at three times, the signal is off only about 40%. In addition, offset faults, which may be generally characterized by an offset damped wave, may introduce a fault signal in which only one-half of each cycle is detected. Applicants have found that the signal processing may be constructed to readily maintain reliable detection of such faults.

In summary, the one feature of the present invention provides a means to significantly minimize the cost of the sensing or pick-up means while also permitting low current sensitivity and without sacrificing the reliability of the detection system.

Thus, in response to a fault detection signal, the transistors 27 and 31 will be turned on during the peak period of each half-cycle of current. Such turn on rapidly charges the capacitor 34 so that it will maintain the transistor 36 on until the next peak period of the following half-cycle to maintain a fault signal as long as the capacitor 34 is recharged by each half-cycle. For example, the discharge time of the capacitor 34 may be selected to be of the order of twelve milliseconds. If the capacitor 34 is not charged by the next succeeding half-cycle, the capacitor will, therefore, completely discharge and turn off the transistor 36 until a new peaked condition is sensed. Further, under offset fault conditions, the fault signal may be such that a signal occurs only every other half-cycle. The hold-on means may be readily set for longer periods such as twenty milliseconds to hold transistor 36 on as long as the capacitor is charged each complete cycle.

The fault output signal from transistor 36 is applied to the timing circuit 8 and in particular to the base of a normally conducting transistor 38 which is connected to hold the timing circuit off. The emitter of transistor 38 is connected to ground and the collector is connected in series with a limiting resistor 39 to the timing circuit 8 which is shown as a passive R-C network. A cascaded transistor 40 has its input connected to the output of transistor 38 and its output connected to the timing circuit 8 through resistor 39. Thus, in the absence of conduction of transistor 36 the transistors 38 and 40 receive turn-on current via resistor 37 and conduct. This resets and holds the timing section 8 in a stand-by or start position by discharging of the capacitor network. When the transistor 36 conducts, it bypasses input current from the transistor 38 which turns off transistor 38 and 40 and permits the timing section to initiate a timing cycle.

The illustrated embodiment of circuit 8 includes a pair of parallel branch circuits 41 and 42 having a timing current input line 43 connected as hereinafter described to a unique averaging current supply 44 and a common output connected to the ground 19. One branch 41 includes a resistor 45 in series with a paralleled resistor-capacitor 46, with the junction thereof connected by a diode 47 to the resistor 39, and thus to the transistors 38 and 40. The second branch 42 includes a capacitor 48, the top side of which is connected to the timing current line 43 and to the signal resistor 39 by a diode 49. An output diode 50 connects the top side of the capacitor 48 to the output stage or circuit 9. The resistive capacitor network, of course, controls the time-delay curve of the timing section and thus controls the actuation of the output stage. With the transistor 36 in the normally off condition, turn on current is supplied through the resistor 37 to the transistor 38 and the transistors 38 and 40 conduct. The timing current is diverted to ground thereby preventing charging of the timing capacitors and generating of an output signal to the output stage 9. When a fault occurs, transistor 36 is turned on, and timing s initiated. During the initial charging of the power supply capacitors 17 and before being charged to a sufficient level for satisfactory operation of the control circuit, the transistor 36 cannot turn on and the transistors 38 and 40 conduct to discharge the capacitors of the timing network 8 and ensure referencing thereof to the starting position.

The timing current is derived from the averaging current section 44 which, in the illustrated embodiment of the invention, includes a capacitor 51 connected in parallel with sensor resistor 18 in series with a blocking diode 52. Diode 52 connects the output of the pick-up line 16 to the capacitor 51, the opposite side of which is connected to line 22. The peak output of the fault signal will be stored on capacitor 51 via the diode 52.

The capacitor 51 discharges to the timing network 8 through a fixed resistor 53 in series with an adjustable resistor 54 and the output of a transistor 55. The base of transistor 55 is connected to the power supply line 22 and the emitter is connected to the variable resistor 54 while the collector is connected to the timing circuit 8 via a resistor 56. The timing supply capacitor 51 discharges through the resistors 53 and 54 and the emitter to base circuit of the transistor 55 to turn the transistor on, providing emitter current essentially proportional to the signal on capacitor 51. The time constant of the discharge circuit is selected to establish a significantly high average current and thus stores a signal proportional to the fault current. This effectively eliminates the effect of saturation of the current transformers including offset type and, consequently, the small, low cost current transformer can be readily employed.

The transistor 55 is also connected in a common base configuration such that the emitter current follows the fault current level as stored on the capacitor 51 and the collector current also essentially follows the fault current to charge the capacitor network in accordance with the desired functioning and generate a trigger signal after selected time delay.

The illustrated output stage 9 includes a coupling transistor 57 having its base connected to the input signal line and its emitter connected to the common ground line through the Zener diode 28. The collector is connected via a coupling resistor 58 to the base of one transistor 59 and the collector of a second transistor 60. The emitter of the transistor 59 is connected to the power supply line 22 via the Zener diode 32. Transistors 59 and 60 are thus regeneratively interconnected to drive each other on in response to initial turn on of the transistor 59 to thereby function as a rapid turn on switch means for developing a pulse signal. The output stage is preferably constructed employing discrete transistors 59 and 60 to permit connection of small stabilizing capacitors 61, one each across the input of each transistor. The capacitors 61 prevent triggering of this switch means by the rising bus voltage while permitting the regenerative action in response to an input signal. The emitter of the transistor 60 is connected to ground in series with a pair of series connected resistors 62 and 63. The gate to cathode input of a controlled rectifier 64 is connected across resister 63. The controlled rectifier has an anode to cathode circuit connected in series with the trip coil 4 across the power supply line 22 and the ground 19. Thus, when the voltage across resistor 63 rises to a turn-on voltage level, the SCR fires and the trigger or trip coil 4 is energized and operates the circuit breaker to open the circuit. A holding resistor 65 is shown connected in parallel with the trip coil 4 to maintain current through the circuit to hold the SCR 64 on and thereby hold until coil 4 operates. Thus, the fault detection system is driven from the self-contained capacitors 17 with the system inhibited until such time as the voltage is sufficient to reliably operate the system. The series sensing resistor 18 establishes a minimum trip current as well as developing a voltage on the timing capacitor proportional to the pick-up value of current. Therefore, by providing different valued, sensing resistor 18, the same time delay network yields the same curve to different normalized value of pick-up current.

In summary, in the illustrated embodiment of the present invention, the sensing currents are applied in series with the sensing resistor and the power supply capacitor to charge the capacitor to the operating voltage. The resistor, in turn, is connected to conjointly control with an operating voltage detection means a signal processing and timing network including a sensing transistor or other solid state switch to develop an output signal in response to abnormal sensed current conditions. The voltage limiting means in parallel with the power supply capacitor means retains the current source after the capacitor is charged to or above the operating level.

Figure 5:
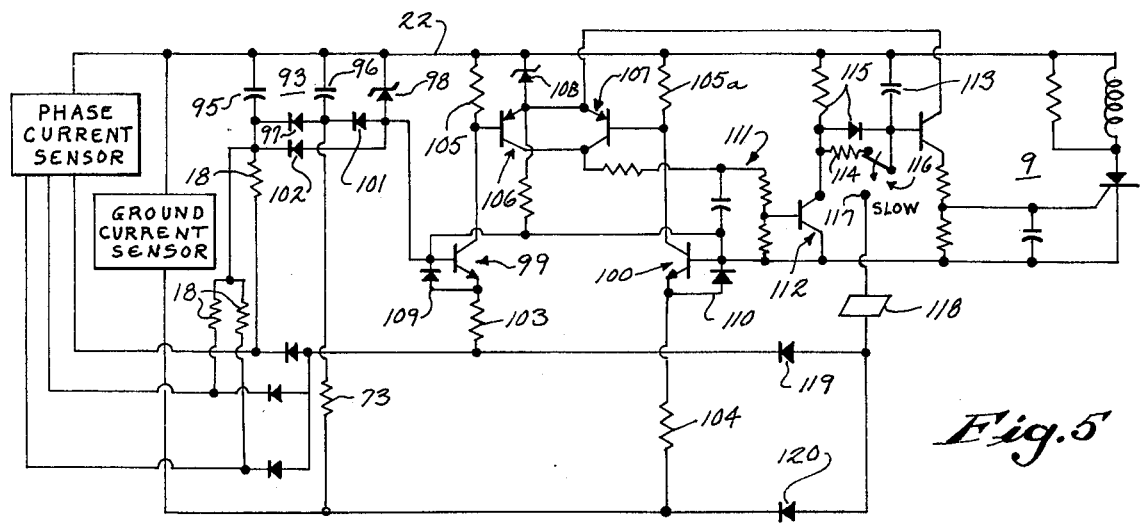
FIG. 5 is a further modified input showing the alternate phase current sensing and improved ground sensing fault sensing pick-up network.

An alternative embodiment of the invention is shown in FIG. 2 applied to actuate an automatic recloser 66 for a three phase circuit in response to phase current fault and to ground current fault. The circuit power supply section 10, signal processing circuit or section 7, timing circuit 8 and output section 9 may essentially correspond to the embodiment of FIG. 1 and corresponding elements as similarly numbered or to other suitable outputs such as shown in FIG. 5.

In the embodiment of FIG. 2, the phase currents of the three phase supply are monitored by three current transformers 67 connected to the usual diode bridge network with each of the outputs similarly rectified by individual diode bridge 68 and providing individual signal lines 69. Each of the signal lines 69 is shown separately and similarly connected, as the single transformer of FIG. 1, to charge the power supply capacitors 17 and to the special timing supply capacitor 51. In FIG. 2, isolating diodes 69a are connected in each connection to the timing supply connecting diode 52.

Additionally, in FIG. 2, ground current faults are monitored by three current transformers 70 which are coupled to the three phase system. The transformers 70 are connected in parallel to a full-wave diode bridge 71 to produce a fault related signal at a ground fault signal line 72 which is connected via a series diode 72a to supply current via the diode 52 to the timing power supply capacitor. A separate ground fault resistor 73 is connected between the signal line 72 and the power supply line 22 to capacitors 17 to also provide charging current to the capacitors 17.

A separate ground fault sensing transistor 74 is connected in circuit in the same common base configuration as the phase ·urrent sensing transistor 23. Thus, transistor 74 is connected with its input in parallel with the sensing resistor 73 and its output in series with a coupling resistor 75 and a control transistor 76 which is connected in parallel with the transistor 27 in the phase current detection pick-up signal processing circuit.

The fault ground signal is thus processed in the same manner as the phase current fault signal to selectively actuate the transistor 36.

The fault signal cannot, however, trigger the circuit until the capacitors 17 are charged to the preselected operating level, and the curcuit is thus inhibited until the circuit is armed to properly activate the system.

Once properly armed, the signal processing circuit will respond to either fault condition to release the timing circuit The ground fault signal line 72 is also connected via a blocking diode 72a to charge the timing supply capacitor 51 which is otherwise connected in circuit as in FIG. 1.

In accordance with a further aspect of the illustrated embodiment of the invention of FIG. 2, a minimum time delay is introduced into the protective device even in the presence of extremely heavy fault conditions by clamping of the level of the fault signals at the inputs to the signal processing circuitry 7 and to the timing power supply capacitor 51. Thus, a diode 78, in series with a Zener diode 79 is connected between the fault sensing lines 69 and the supply line 22 and, therefore, in parallel with the phase sensing resistors 18. This limits the voltage developed across such sensing resistors. A diode 80 is similarly connected between the ground fault sensing line 72 and the Zener diode 79 to provide a corresponding maximum voltage developed across the ground current sensing resistor 73. the clamping circuit prevents build-up of voltage on either or both of the resistors 18 and 73 and also establishes the maximum fault timing current. The illustrated clamping means thus controls the sensing means to maintain a fault signal proportional to line or primary system current to a selected level and thereafter produces a predetermined constant fault signal with the resulting controlled energization of the time delay means. Other clamping means may be employed to produce a similar sharp cutoff or other modifying clamping means to charge the timing curve may be employed. For example, a resistor in series with the illustrated diode 79 will increase the slope of the time delay curve to some characteristic less than infinity as essentially occurs with the Zener diode. This improvement is desirable to limit the response of a circuit, for example, in those instances where a fuse should blow to clear the fault instead of the recloser in response to certain abnormal fault conditions. Thus, a fuse may be introduced into the primary system with a time delay curve which will actuate the fuse in response to the heavy fault conditions before the normal actuated timing of the protective device. The illustrated circuit thus provides the desired, reliable, repeatable timing even though low cost saturable transformers are employed.

Further, the clamping circuitry establishes a minimum time delay before tripping which is independent of the secondary sensed output current. The sharing of the time delay system from different pick-ups significantly minimizes the cost of the system and thus particularly adapts it to a wide variety of application, where such time sharing is completely adequate. If separate time curves are required, separate processing and timing systems will be required. A common power supply means may be maintained.

the circuit of FIG. 1 which is illustrated as being applied to a line current sensing may also be employed as a highly sensitive ground fault sensing unit with a constant timing for operation of a single shot fault interrupter, lockout tripping of a multiple actuated recloser or the like, for example, as shown in FIG. 3.

In this embodiment, the separate timing supply capacitor network 44 may be eliminated and the timing circuit connected to be driven directly from the power supply capacitors 17, as follows.

In FIG. 3, the fault sensing pick-up and signal processing means as well as the output stage may be constructed as shown in FIGS. 1 or 2 and thus no further illustration or description thereof is given.

In FIG. 3, the timing supply transistor 55 has its emitter connected in series with a timing resistor 81 to the fault power supply line 22. The base is connected to ground via a resistor 82 and to the line to Zener diode 32 by a blocking diode 82a. The collector is connected to supply current to a timing capacitor 83. A reset diode 84 connects the top side of capacitor 83 to the transistor 39 which is driven from the fault signal processing circuit and an output coupling diode 85 connects the capacitor as the input to the output stage 9.

Thus, when a fault condition occurs, transistor 39 is driven off and capacitor 83 is allowed to charge. If the fault is of a selected number of cycles, transistor 39 is held off sufficiently long to allow the charge on capacitor 83 to rise to the level necessary to trigger the output stage 9 and actuate a suitable low energy trip coil for a one-shot interrupter or any other suitable circuit opening means.

Figure 4:
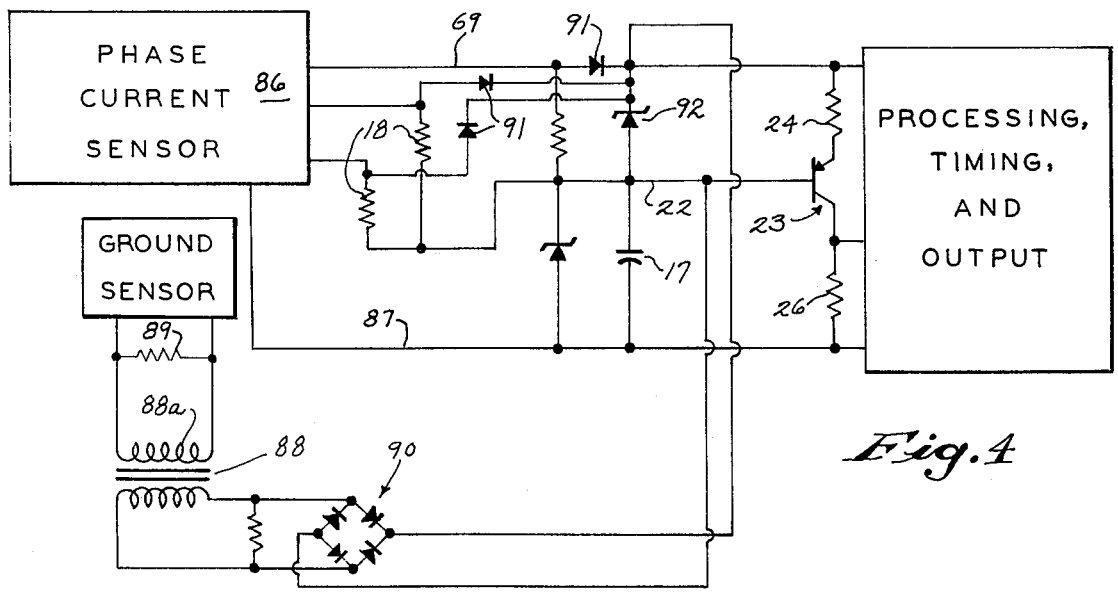
FIG. 4 is a view showing an alternate embodiment of the invention employing a single sensing transistor.

Although individual pick-up and coupling transistors are illustrated in FIG. 2 for developing related ground fault and current fault signals, a common input sensing transistor may be employed, for example, as shown in FIG. 4. In FIG. 4, the line current sensing network 86 includes a suitable current transformer and rectifying unit such as shown in FIG. 2 with individual signal lines 69 similarly connected as in FIG. 2 through the individual sensing resistors 18 to the power supply capacitors 17 and to common sensing transistor 23, with a common or neutral line 87 to network 86. The ground fault sensing means includes a transformer 88 having a primary winding 88a connected across a pick-up resistor 89 to sense unbalanced current. The transformer secondary is connected to a full wave diode rectifier 90, the output of which is connected across the base to emitter circuit of the common sensing transistor 23 in series with its emitter resistor 24. Blocking diodes 91 are connected one each in the phase signal line 69 connection to block the ground fault current path to the phase sensing resistors 18. A Zener diode 92 is paralleled with the resistor 18 and diode 91 and thus in parallel with the output of the ground fault sensing rectifier 90 and the input to the transistor 23.

In the embodiment of the invention illustrated in FIG. 4, the common sensing transistor drives the transistors in the same manner as previously described. Generally, the transformer circuit is known for providing a pair of related fault signals but the connection into the illustrated embodiment of the invention provides for the unique common sharing of the signal processing circuit and the sharing of the common time delay curves.

The signal processing circuit and the inhibit means may also be varied. For example, a further embodiment of the invention showing a modification in the processing and inhibiting as well as the timing circuit is shown in FIG. 5.

In the embodiment of FIG. 5, the line sensing or ground fault sensing networks may be of any suitable construction as heretofore discussed and are shown in block diagram coupled to charge a modified power supply capacitor means 93 in series with the individual resistors which, in FIG. 5, are connected between the return side of the capacitor network and the return line. The output signal line has an opposite polarity as the signal circuitry is shown having opposite type transistors.

The power supply capacitor means 93 includes a pair of power supply capacitors 95 and 96 connected in common to the output of the fault signal lines. Capacitor 95 is connected to the phase line signal through the line resistor 18. The second capacitor 96 is connected to the ground fault source through the separate ground fault sensing resistor 73 and to the line fault sensing resistor 18 through a diode 97. A Zener diode 98 of an appropriate voltage level is connected into the circuit of a pair of paralleled sensing transistors 99 and 100 and to the second power supply capacitor 96 by diode 101. The diode 101 provides an alternate current path to the ground sensing resistor 73. A further diode 102 connects the sensing transistor to the line phase sensing resistor 18. When the Zener diode 98 initiates conduction the phase current will take a preferred path directly to the phase resistor through the diode 102. The diode 101 therefore essentially only carries ground fault current and the voltage drop across the diode 101 is not affected by load or phase current. As a result improved ground fault sensing is created.

The diode voltage drop of diodes 101 and 102 also approximates the base to emitter voltage of the sensing transistors 99 and 100 with changes in temperature and provides temperature stabilization for the operation of the transistors.

The diode network is back biased during the initial charging of the power supply capacitors 95 and 96. When the capacitors 95 and 96, however, charge to the level of the Zener diode 98, for example, on the order of twelve volts, the Zener diode will begin to conduct and define the alternate current path to the sensing network and a current path to the base to emitter junctions of transistors 99 and 100. These transistors are shown in a common base circuit configuration with the emitters connected respectively to the line fault sensors and the ground fault sensor, respectively, by separate emitter resistors 103 and 104. The emitter currents are thus proportional to the sensing currents and the voltage on the emitter resistors 104 will be essentially that of the voltage across the ground fault sensing resistor 73 while the voltage on resistor 103 will be the greatest of the voltages on the three phase sensing resistors 18.

The collector current is, therefore, also proportional to the sensing voltage and develops related voltage across collector resistors 105 and 105A which, in turn, are connected to the inputs of a pair of paralleled transistors 106 and 107. The emitters of transistors 106 and 107 are connected in series with a Zener diode 108 to power line 22 and the collectors are connected in common and provide an output to the timing circuit. The Zener diode establishes a minimum voltage which is selected to establish a temperature stable triggering at the base of the various controlled transistors.

In the embodiment of FIG. 5, diodes 109 and 110 are also shown connected across the base to emitter junction of sensing transistors 99 and 100 and are reverse biased by the power supply fault currents.

When either transistor 106 or 107 turns, current is supplied to actuate a transistor-capacitor holding circuit 111 to provide a turn-on signal to a timing circuit control transistor 112, generally as in FIG. 3. The timing circuit includes a capacitor 113 connected across the capacitors 95 and 96 in series with a coupling resistor 114 and transistor 112. A series connected resistor-diode 115 is connected across the capacitor 113 to initially discharge the capacitor. When the transistor 112 conducts, the capacitor 113 charges, with a relatively fast, constant time delay. When the voltage on the capacitor 113 reaches the triggering level, the output stage 9 is triggered to actuate the tripper or other actuating means in the manner as previously described. In FIG. 5, a fast-slow timing switch 116 is shown having a first position completing the fast time circuit described above. Each trigger signal may actuate a hydraulic counting means for controlling lock-out in accordance with the number of faults and also actuating of switch 116 to introduce a final, slow timing sequence.

The slow timing contact 117 of switch 116 introduces a different resistance network. In the illustrated embodiment of the invention, a varistor 118 is connected between the contact 117 and the respective phase and groud sensors via the diodes 119 and 120, respectively. The varistor will provide a high, inverse time constant. A simple, inverse time constant may be established by employing a fixed resistor in place of the varistor. Alternatively, a fixed resistor of a relatively high value may be connected between the contact 117 and the collector of the transistor 112. The fast and slow timing curves essentially have the same shape but will be shifted for different phase and ground pick-ups.

In each of the illustrated embodiments of the invention the fault signal processing means is positively held off or inhibited until such time as the power supply means is armed at an adequate operating voltage level for actuating the tripping circuitry. The other features and teachings of this invention provide a simple and inexpensive circuitry for providing a phase line and/or ground fault sensing the use of relatively low cost current transformers and permitting time sharing of the time delay circuitry. While various embodiments of the invention have been illustrated, various, further modifications to such circuits may, of course, be employed without departing from the inherent scope of the present invention.

Various modes of carrying out the invention are contemplated as being within the scope of the following claims, particularly pointing out and distinctly claiming the subject matter which is regarded as the invention.

We claim:

1. In a protective device coupled to an electrical system and including switch means for opening and closing the system, switch opening means for operating said switch means and actuating circuit means for actuating said switch opening means in response to receipt of an input signal, the combination comprising sensing means coupled to said electrical system and producing an output sensing current signal related to the current in the system, said sensing current being of a low milliampere level, overcurrent detection means connected to the sensing means and responsive to predetermined overcurrents in said system for producing a fault signal, a signal processing circuit connected to the overcurrent detection means and to the actuating circuit means for producing an input signal to the actuating circuit means in response to a fault signal, a power supply means for providing power to the protective device and having a rechargeable storage means for storing of electrical power and connected to the current sensing means and charged by the output thereof, said power supply means being connected to the overcurrent detection means for supplying operating power output to the fault detection means and to the signal processing circuit and to the actuating circuit means, said overcurrent detection means and signal processing circuit and actuating circuit means being operable to load and clamp said power supply means at an inoperative level in the presence of said sensing currents, and inhibiting means connected to the output circuit of the detection means for inhibiting an output from the overcurrent detection means to the signal processing circuit until said storage means has been charged to a minimum preselected operating level sufficient to establish said operating power and prevent said clamping at an inoperative level.

2. In the combination of claim 1 wherein said sensing means including signal coupling means and minimum trip resistance means connected to the power supply means for charging said power supply means, said overcurrent detection means including a sensing amplifier and voltage sensitive means having an input connected to said resistance means and responsive to the voltage of the power supply means for inhibiting said process circuit until the storage means is charged to a selected voltage level, said minimum trip resistance means limiting the input to the sensing amplifier means and establishing a minimum trip.

3. The combination according to claim 1 and further including a time delay means for activating said actuating circuit means and initiating timing only in response to a fault signal and release of the inhibiting means.

4. The combination according to claim 3 and further including a separate timing power supply means for supplying of power to the time delay means and connected to said sensing means and charged thereby and having means for effectively increasing the average current to the time delay means.

5. The combination of claim 4 wherein said timing power supply means includes a timing supply capacitor connected to be charged from said sensing means, and a single discharge circuit having a relatively large time constant for slowly discharging said timing supply capacitor to said time delay means.

6. The combination of claim 1 wherein said sensing means including current transformer means conductively connected to said detection means for producing said output sensing current signal and including a time delay means controlled by said detection means, for delaying the signal of the detection means, a timing power supply includes a capacitor for supplying power to the time delay means and connected to be charged from said sensing means, and a discharge circuit having a relatively large time constant to slowly discharge said timing supply capacitor to said time delay means, said current transformer means being saturated by fault current signals.

7. The combination of claim 6 wherein said current transformer has a continuous uninterrupted core with a secondary winding wound thereon, said core having an open circuit saturation voltage of the order of 100 volts.

8. The combination according to claim 1 wherein said detection means includes an input transistor connected to respond to the sensed overcurrent and further comprising clamping means connected between the input transistor and the sensing means for clamping the signal to said transistor means and establishing a predetermined maximum timing current to establish a minimum timing delay and further permitting relatively heavy fault currents for short duration.

9. In the combination of claim 1 wherein said sensing means includes a line current sensing means for establishing a line current fault signal and a ground fault sensing means for establishing a ground fault signal, a common signal processing circuit connected to both said line current and ground fault sensing means and establishing a timer initiating signal in response to either signal, and a common time delay means connected to said actuating circuit means and to said signal processing circuit and responsive to said initiating signal for establishing a time delayed signal to the actuating circuit means.

10. In a fault sensitive protective device coupled to an alternating current system and including switch means for opening said system, switch opening means for operating said switch means and actuating circuit means for actuating said opening means in response to receipt of an input fault signal, the combination comprising current transformer means coupled to said alternating current system and establishing a direct current signal proportional to the system current, pickup means conductively connected to said transformer means for establishing a fault related signal, a signal processing circuit connected to said pickup means and responsive to predetermined sensed overcurrents in said pickup means to produce one of said input fault signals to the actuating circuit means, a power supply capacitor means for supplying of power to the pickup means and to the signal processing circuit and to the actuating circuit means, a voltage limiting means connected across the power supply capacitor means for establishing the maximum operating voltage and maintaining a low impedance current path and thereby maintain current source input means, said pickup means including sensing resistor means for developing a voltage signal in accordance with the direct current signal and connected in series with the capacitor means for charging the capacitor means to an operating voltage level sufficient to operate the pickup means and the processing circuit and actuating circuit means to operate said switch opening means, and voltage responsive means connected in said pickup means to said capacitor means and inhibiting said producing of the fault signal until such capacitor power supply means is charged to said operating level.

11. The fault sensitive protective device of claim 10 wherein said transformers are conductively connected to said sensor resistor means and have a core coupled to the system, said core operating in the linear region of the core characteristic and thereby establishing essentially constant exciting current and core losses during the operation of the protective device.

12. The fault sensitive protective device of claim 10 wherein said pickup means includes a sensing transistor means connected across said sensing resistor means for responding to the voltage across said sensing resistor means, a coupling transistor means connected to said sensing transistor means for providing a fault signal and having an output circuit including a second voltage sensitive means connected to the capacitor means for establishing said fault signal only in response to a direct current signal from said transformer means of a predetermined magnitude and said operating voltage level on said capacitor means.

13. The fault sensitive protective device of claim 10 wherein said voltage limiting means is a Zener diode establishing a maximum operating voltage of the order of 20 volts and said processing circuit responds to fault related signals of the order of 2 volts.

14. The fault sensitive protective device of claim 10 wherein said voltage responsive means includes a voltage sensitive means for establishing a conducting path in response to a selected voltage level and connected across the capacitor means in series with a diode means for producing a unidirectional current path, and a sensing transistor includes an input connected to said pickup means in series with said voltage sensitive means whereby said capacitor means must be charged to the selected operating voltage level to supply turn on current to the sensing transistor through the inhibit means.

15. The combination according to claim 12 further comprising clamping means connected between the sensing resistor transistor and the sensing means for clamping the fault related signal to a selected maximum level and establish a predetermined minimum response time and thereby permitting relatively heavy fault currents for short durations.

16. The combination according to claim 10 and further including a timing means for transmitting the input signal only in response to a fault related signal of selected duration, and a separate timing power supply means for supplying power to the timing means and connected to said current sensing means and charged thereby and having means for effectively increasing the average current to the timing means.

17. The combination of claim 16 wherein said timing power supply means includes a timing supply capacitor connected to be charged from said sensor means, and a discharge circuit having a relatively large time constant to slowly discharge said timing supply capacitor to said timing means.

18. In a fault sensitive protective device coupled to an alternating current system and including switch means for opening said system, switch opening means for operating said switch means and actuating circuit means for actuating said opening means in response to receipt of an input fault signal, the combination comprising current sensing and pickup means coupled to said alternating current system and establishing a direct current signal proportional to the system current and a signal processing circuit responsive to predetermined sensed overcurrents in said pickup means to produce one of said input fault signals to the actuating circuit means, a power supply capacitor means for supplying of power to the pickup means and to the signal processing circuit and to the actuating circuit means, a voltage limiting means connected across the power supply capacitor means for establishing a maximum operating voltage and maintaining a low impedance current path and thereby maintain a current source input to the capacitor means, a sensing resistor means for developing a voltage proporational to the direct current signal and connected in series with the capacitor means to the pickup means for charging the capacitor means to an operating voltage level sufficient to operate the processing circuit and actuating circuit means to operate said switch opening means, voltage responsive means connected in said signal processing circuit and to said capacitor means for inhibiting said producing of the input fault signal until such capacitor power supply means is charged to said operating level, said pickup means includes a sensing transistor means connected across said sensing resistor means for responding to the voltage across said sensing resistor means, a first coupling transistor having an input connected in series with the output of the sensing transistor means and a voltage sensitive device and a second coupling transistor having its input connected in series with a second voltage sensitive device to said power supply capacitor means and to the output of the first coupling transistor in series with said first voltage sensitive means, said first and second coupling transistors establishing said fault signal only in response to a direct current signal from said transformer means of a predetermined magnitude and said operating voltage level on said capacitor means.

19. In a fault sensitive protective device coupled to an alternating current system and including switch means for opening said system, switch opening means for operating said switch means and actuating circuit means means for actuating said opening means in response to receipt of an input signal, the combination comprising current sensing means including pickup means coupled to said alternating current system and establishing a direct current signal proportional to the system current and a signal processing circuit responsive to predetermined sensed overcurrents in said pickup means to produce one of said input signals to the actuating circuit, a power supply capacitor means for supplying of power to the pickup means and to the signal processing circuit and to the actuating circuit, a voltage limiting means connected across the power supply capacitor means to establish the maximum operating voltage and maintaining a low impedance current path and thereby maintain current source input means, a sensing resistor means connected in series with the capacitor means to the pickup means to charge the capacitor means to an operating voltage level sufficient to operate the processing circuit and actuating circuit means means to operate said switch opening means, voltage responsive means connected in said signal processing circuit and to said capacitor means and inhibiting said producing of the input signal until such capacitor power supply means is charged to said operating level, wherein said voltage responsive means includes a voltage sensitive means for establishing a conducting path in response to a selected voltage level and connected across the capacitor means in series with a diode means for producing a unidirectional current path, and a sensing transistor includes an input connected to said pickup means in series with said voltage sensitive means whereby said capacitor means must be charged to the selected operating voltage level to supply turn on current to the sensing transistor through the inhibit means, said sensing means includes a line current sensor and a ground fault sensor, said capacitor means including a pair of capacitors having a common connection to both said sensors, individual series resistors connecting the opposite ends of the capacitors one each to said sensors, said voltage sensitive means and said diode means being connected in series across the capacitor connected to the ground fault sensor, a second diode means for producing a unidirectional current path and connected from the junction of the voltage sensitive means and the first diode means to the resistor connected to the line current sensor, a third diode means for producing a unidirectional current path and connected between said capacitors, and all of said diode means being similarly polarized with respect to the voltage sensitive means.

20. In a fault sensitive protective device coupled to an alternating current system and including switch means for opening said system, switch opening means for operating said switch means and actuating circuit for actuating said opening means in response to receipt of an input signal, the combination comprising current sensing means coupled to said alternating current system and establishing a direct current signal proportional to the system current, a pickup means for establishing a signal proportional to said direct current signal and a signal processing circuit responsive to predetermined sensed overcurrents in said pickup means to produce one of said input signals to the actuating circuit, a power supply capacitor means for supplying of power to the pickup means and to the signal processing circuit and to the actuating circuit, a voltage limiting means connected across the power supply capacitor means for establishing the maximum operating voltage and maintaining a low impedance current path and thereby maintain current source input to the capacitor means, a sensing resistor means for producing a voltage signal proportional to the direct current signal and connected in series with the capacitor means to the pickup means to charge the capacitor means to an operating voltage level sufficient to operate the processing circuit and actuating circuit means to operate said switch opening means, voltage responsive means connected in said signal processing circuit and to said capacitor means and inhibiting said producing of the input signal until such capacitor power supply means is charge to said operating level, said pickup means includes a sensing transistor having an input connected across said sensing resistor, a first coupling transistor having an input connected in series with the output of said sensing transistor and a Zener diode, a second coupling transistor having an input connected in series with a second Zener diode and said first coupling transistor, a control capacitor, a control transistor connecting said control capacitor to a power supply and having an input connected to said second coupling transistor, a timing control transistor having an input connected to said capacitor in series with a resistor means, said resistor means establishing a relatively slow discharge time on the order of the period between successive cycles of said alternating current applied, whereby said timing control transistor is held on in response to recharging of said control capacitor for each cycle of the alternating current system, and a time delay means for inserting a time delay into said processing circuit and connected to said control transistor and including a capacitor charged to a selected level in response to actuation of the control transistor.

21. In the combination of claim 20 further including a timing power supply including a capacitor, diode means for establishing a unidirection current path and connecting said timing supply capacitor to said sensing means for rapidly charging thereof to the peak value of the sensing means, a discharge transistor having an input circuit connected in series with a time constant resistance means for controlling the time constant of the input circuit and connected across said timing supply capacitor and having an output circuit connected to the time delay means, said resistance means establishing a large time constant and increasing the average current supply to said time delay means to maintain timing essentially independent of saturation of said current transformers.

22. In the combination of claim 20 and further including an output signal section having a triggered switch means for producing on-off conducting states and including regeneratively connected transistors connected to the capacitor of the time delay means to form an output signal in response to the output signal of the time delay means, and a gated switch connected in series with a switch operator means for operating of said switch opening means across said power supply capacitor means and having a gate means connected to the triggered switch means for turning said gated switch on.

23. In the combination of claim 22 wherein said regeneratively connected transistors each includes a stablizing capacitor in parallel with the input thereby to prevent triggering in response to raising bus voltage on said power supply capacitor means, said capacitor permitting the rapid turn on of the triggered switch means in response to the output signal from the time delay means.

24. In a protective device coupled to an electrical system and including switch means for opening and closing said system, switch opening means for operating said switch means and actuating circuit means for actuating said opening means in response to receipt of an input signal, the combination comprising current transformer means for connection to the electrical system and having a closed coupling core coupled to said alternating electrical system and having windings producing a current signal proportional to system current, detection means responsive to predetermined overcurrents in said system for producing one of said input signals to the actuating circuit means, a power supply capacitor means for supplying power to said detection means and to said actuating circuit means and conductively connected to the windings of said current transformer means and charged by the output thereof, voltage limiting means connected across said power supply capacitor means for charging of the capacitor means to a preselected level and thereafter defining a low impedance path and thereby creating and maintaining a current source to said capacitor means, said transformer core being saturated be selected fault currents, said core is saturated by offset fault currents and produces a fault signal for each alternate half cycle of the line current, said core being saturated by peak fault line current, the peak fault current essentially being proportional with peak line current to maintain reliable detection, and a separate timing supply capacitor conductively and directly connected to said current transformer means and charged each cycle to the peak fault current level and effectively maintaining a fault signal for the period of one cycle.

25. The combination of claim 24 having a time delay means for creating a delay in signal transmission, a discharge circuit of relatively large time constant to slowly discharge said timing supply capacitor to said timing means and thereby essentially eliminate the effects of transformer core saturation.

26. In the combination of claim 24 wherein said transformer core is operated by normal system current on the linear region of the core magnetic characteristic and in a region having an essentially minimal exciting current deviation, and said detection means responds to the peak value of the fault signals above the power supply capacitor voltage.

27. In the combination of claim 24 wherein said core is an annular core on the order of four inches diameter and having a cross sectional area on the other three-quarters of three-quarters of a square inch.

28. In a protective device coupled to an electrical distribution system and including switch means for opening and closing the system, switch opening means for operating said switch means and actuating circuit means for actuating said opening means in response to an input signal, the combination comprising line current sensing current transformer means coupled to said electrical system for producing a signal proportional to line current, a signal detection and processing circuit responsive to predetermined overcurrent conditions in said system for producing an input signal to the actuating circuit means, said transformer means having coupling cores saturated by fault currents in said system, a capacitive power supply means connected to be charged from the current sensing means and connected for supplying power to the actuating circuit and to the signal detection and processing circuit means a current responsive time delay means for creating a time delay in said processing circuit, a separate timing power supply capacitor means connected to said current sensing current transformer means and charged to the peak value of the output of the transformer means for providing a separate power supply related to the peak level of the line current and discharge means connecting the timing power supply capacitor means to the time delay means for controlling the level of the average current supplied to the time delay means and thereby minimize the effect of saturation of the current transformer means.

29. The combination of claim 28 wherein said discharge circuit means includes a transistor in a common base configuration with its input means connected in series with the timing power supply capacitor means in series with a relatively large time constant resistors and said transistor discharging said timing supply capacitor to said timing means.

* * * * *

UNITED STATES PATENT AND TRADEMARK OFFICE
CERTIFICATE OF CORRECTION

PATENT NO. : 4,027,203
DATED : May 31, 1977
INVENTOR(S) : RICHARD J. MORAN ET AL

It is certified that error appears in the above-identified patent and that said Letters Patent are hereby corrected as shown below:

Column 2, Line 21, after "control circuit" cancel "is" and insert --- in ---;

Column 5, Line 4, after "transient" cancel "protection" and insert --- protective ---;

Column 5, Line 65, before "bias" cancel "a" and insert --- A ---;

Column 9, Line 45, after "phase" cancel "urrent" and insert --- current ---;

Column 9, Line 60, after "circuit" insert a period --- (.) ---;

Column 10, Line 11, after "73." cancel "the" and insert --- The ---;

Column 10, Line 47, before "circuit" cancel "the" and insert --- The ---;

UNITED STATES PATENT AND TRADEMARK OFFICE
CERTIFICATE OF CORRECTION

PATENT NO. : 4,027,203
DATED : May 31, 1977
INVENTOR(S) : RICHARD J. MORAN ET AL

It is certified that error appears in the above-identified patent and that said Letters Patent are hereby corrected as shown below:

| | | | | |
|---|---|---|---|---|
| Column | 12, | Line | 36, | before "which" cancel "105A" and insert --- 105a ---; |
| Column | 13, | Line | 7, | before "sensors" cancel "groud" and insert --- ground ---; |
| Column CLAIM 15 | 16, | Line | 6, | before "transistor" cancel "resistor" and before "means" insert --- resistor ---; |
| Column CLAIM 19 | 17, | Line | 7, | before "for" cancel "means means"; |
| Column CLAIM 19 | 17, | Line | 26, | before "to" cancel "means means"; |
| Column CLAIM 28 | 20, | Line | 27, | after "circuit" insert --- means ---; |

UNITED STATES PATENT AND TRADEMARK OFFICE
CERTIFICATE OF CORRECTION

PATENT NO. : 4,027,203
DATED : May 31, 1977
INVENTOR(S) : RICHARD J. MORAN ET AL

It is certified that error appears in the above–identified patent and that said Letters Patent are hereby corrected as shown below:

Column 20, Line 28, CLAIM 28    after "circuit" cancel "means" and insert --- a comma (,) ---;

Column 20, Line 35, CLAIM 28    before "discharge" insert --- a ---;

Signed and Sealed this

Twenty-first Day of February 1978

[SEAL]

Attest:

RUTH C. MASON
*Attesting Officer*

LUTRELLE F. PARKER
*Acting Commissioner of Patents and Trademarks*